US012258189B2

(12) United States Patent
Somers

(10) Patent No.: US 12,258,189 B2
(45) Date of Patent: Mar. 25, 2025

(54) CHILD RESISTANT PACKAGE

(71) Applicant: Henricus Johannes Petrus Somers, Valkenswaard (NL)

(72) Inventor: Henricus Johannes Petrus Somers, Valkenswaard (NL)

( * ) Notice: Subject to any disclaimer, the term of this patent is extended or adjusted under 35 U.S.C. 154(b) by 157 days.

(21) Appl. No.: 17/994,994

(22) Filed: Nov. 28, 2022

(65) Prior Publication Data

US 2023/0415967 A1 Dec. 28, 2023

(30) Foreign Application Priority Data

Jun. 23, 2022 (NL) ...................................... 2032261

(51) Int. Cl.

| | |
|---|---|
| ***B65D 5/54*** | (2006.01) |
| ***A61J 1/03*** | (2023.01) |
| ***B65D 5/28*** | (2006.01) |
| ***B65D 5/42*** | (2006.01) |
| ***B65D 50/06*** | (2006.01) |
| ***B65D 75/34*** | (2006.01) |
| ***B65D 85/60*** | (2006.01) |
| *B65D 5/38* | (2006.01) |
| *B65D 75/58* | (2006.01) |

(52) U.S. Cl.

CPC .............. *B65D 50/066* (2013.01); *A61J 1/03* (2013.01); *B65D 5/28* (2013.01); *B65D 5/545* (2013.01); *B65D 5/38* (2013.01); *B65D 5/542* (2013.01); *B65D 75/585* (2013.01); *B65D 2215/04* (2013.01)

(58) Field of Classification Search

CPC ........... A61J 1/03; B65D 50/066; B65D 5/28; B65D 5/545; B65D 5/542; B65D 5/54; B65D 5/5425; B65D 5/541; B65D 2215/04; B65D 5/0835; B65D 5/4266; B65D 5/38; B65D 85/60; B65D 2575/3227; B65D 75/585; B65D 75/5827; B65D 75/5833; Y10S 229/925; Y10S 229/902; Y10S 206/807

USPC ........ 206/1.5, 531, 807, 532, 77.1; 220/265, 220/200, 242, 925, 160.2, 237, 240, 243; 221/302; 426/122, 123; 229/87.05, 243

See application file for complete search history.

(56) References Cited

U.S. PATENT DOCUMENTS 1,086,154 A * 2/1914 Gagliano ................ B65D 9/32 206/256
1,610,501 A * 12/1926 Ellerman, Jr. ......... B65D 39/02 215/298

(Continued)

*Primary Examiner* — Gideon R Weinerth

(74) *Attorney, Agent, or Firm* — Robert M. McDermott, Esq.

(57) ABSTRACT

A child resistant package comprising a child-resistant packaging containing there within a solid food item comprising a medicine, wherein the packaging has the shape of a box. The packaging is provided with a perforation and the solid food item is provided with a 'void', such as a recess, cut, indentation or hole. The perforation defines a portion of the packaging that is separated at least in part from the remainder of the packaging when the perforation is pierced/punched. The position and shape of the void in the solid food item and the perforation in the packaging correspond, such that, when opening the packaging, the void in the food item facilitates piercing the perforation by enabling the portion of the packaging defined by the perforation to be pushed into the void in the solid food item.

20 Claims, 17 Drawing Sheets

(56) References Cited

U.S. PATENT DOCUMENTS

| | | | | | | |
|---|---|---|---|---|---|---|
| 2,269,525 | A | * | 1/1942 | Fleischer | B65D 83/0835 | 221/33 |
| 2,651,450 | A | * | 9/1953 | Ellsworth | B65D 5/6661 | 229/148 |
| 2,921,673 | A | * | 1/1960 | Ryan | B65D 85/60 | 206/459.5 |
| 3,042,284 | A | * | 7/1962 | Buttery | B65D 5/4204 | 229/243 |
| 3,207,299 | A | * | 9/1965 | Sparks | B65D 75/328 | 206/811 |
| 3,244,356 | A | * | 4/1966 | Wolowicz | B65D 17/4011 | D9/438 |
| 3,324,998 | A | * | 6/1967 | Farquhar | B65D 5/5007 | 206/488 |
| 3,355,089 | A | * | 11/1967 | Champlin | B65D 5/542 | 229/243 |
| 3,389,852 | A | * | 6/1968 | Egli | B65D 5/545 | 229/229 |
| 3,577,258 | A | * | 5/1971 | Sincavage et al. | B29C 59/007 | 428/509 |
| 3,693,785 | A | * | 9/1972 | Sincavage | B65D 75/585 | 229/87.05 |
| 3,721,382 | A | * | 3/1973 | Cavanagh | B65D 85/675 | 229/243 |
| 4,291,806 | A | * | 9/1981 | Austin | B65D 5/4295 | 229/120 |
| 4,312,448 | A | * | 1/1982 | Pelster | B65D 85/675 | 242/146 |
| 4,739,902 | A | * | 4/1988 | Joslyn | A47J 31/08 | 221/210 |
| 5,197,630 | A | * | 3/1993 | Kirla | B65D 83/0835 | 221/210 |
| 5,996,886 | A | * | 12/1999 | Evert | B65D 5/703 | 229/207 |
| 6,138,905 | A | * | 10/2000 | Hachenski | B65D 5/5425 | 229/207 |
| 6,296,175 | B1 | * | 10/2001 | Dixon | B65D 5/685 | 229/102 |
| 7,147,143 | B2 | * | 12/2006 | Cargile | B65D 71/36 | 206/427 |
| 7,886,898 | B2 | * | 2/2011 | Tsakiris | B65D 85/20 | 229/87.05 |
| 11,040,814 | B2 | * | 6/2021 | Van Liempd | B29C 66/43 | |
| 2004/0142074 | A1 | * | 7/2004 | Hentzel | A23G 3/50 | 426/106 |
| 2004/0188314 | A1 | * | 9/2004 | Rock | B65D 75/327 | 206/531 |
| 2005/0061865 | A1 | * | 3/2005 | Marie | B65D 5/542 | 229/242 |
| 2007/0063008 | A1 | * | 3/2007 | El-Afandi | B65D 5/0236 | 229/125.39 |
| 2010/0084457 | A1 | * | 4/2010 | Tsakiris | B65D 85/20 | 229/87.05 |
| 2011/0192849 | A1 | * | 8/2011 | Osorio | B65D 75/585 | 220/529 |
| 2012/0012498 | A1 | * | 1/2012 | Paliotta | B65D 83/0463 | 206/531 |
| 2012/0160731 | A1 | * | 6/2012 | Aldridge | B65D 85/60 | 206/782 |
| 2019/0144155 | A1 | * | 5/2019 | Geng | B65D 5/54 | 229/237 |
| 2021/0276758 | A1 | * | 9/2021 | Chen | B31B 50/20 | |
| 2023/0415967 | A1 | * | 12/2023 | Somers | B65D 50/066 | |

* cited by examiner

CHILD RESISTANT PACKAGE

CROSS-REFERENCE TO PRIOR APPLICATIONS

This application claims the benefit of NL-2032261, filed 23 Jun. 2022 in The Netherlands.

TECHNICAL FIELD

The present invention relates to the technical field of a child resistant package, and in particular to a child resistant package comprising a child-resistant packaging containing there within a medicine.

BACKGROUND

Medicines provide great health benefits. They also, however, may be harmful if taken by those for whom the medicines are not prescribed. This is especially of relevance for children. Therefore there are many examples of child-resistant packaging, intended to form a barrier between the medicines and children. A few examples of such child-resistant packaging are found in the European Patent Application EP3219640A1, the U.S. Pat. No. 11,040,810B1, The United States Patent Application US2008314780A1 and the International Patent Application WO2013151806A1.

The invention aims to provide an improved child resistant package a child-resistant packaging containing an item comprising a medicine.

SUMMARY

To this end, a technical solution adopted by the present invention is:

A child resistant package comprising a child-resistant packaging containing there within a solid food item comprising a medicine, wherein the packaging has the shape of a box. The packaging is provided with a perforation and the solid food item is provided with a 'void', such as a recess, cut, indentation or hole. The perforation defines a portion of the packaging that is separated at least in part from the remainder of the packaging when the perforation is pierced/punched. The position and shape of the void in the solid food item and the perforation in the packaging correspond, such that, when opening the packaging, the void in the food item facilitates piercing the perforation by enabling the portion of the packaging defined by the perforation to be pushed into the void in the solid food item.

Taking medicines is often in the form of pills. Unfortunately many people do not like taking pills.

Administering the medicine via a food item increases the willingness to take the medicine. In itself this is well known. The basis for the famous Belgian chocolate 'pralines' is found in or around 1857 when, according to history, a Belgian pharmacists in Brussels covered medicines with a chocolate coating to please his customers, and possibly also to hide the taste of the medicine. Medicines may be active substances such as THC, CBD, pain reducing agents such as zoals Ibuprofen, Parkingsons disease medicines etc.

Mixing a medicine with a solid food item such as chocolate or candy does improve the willingness of people to take the medicine. However, it also increase the likelihood of children wanting to taste the goodies.

Therefore there is an even greater need to increase the child resistance of the package.

In the invention the child resistance is provided by the combination and correspondence in shape and form of the recess, cut or hole in the solid food item on the one hand and the perforations in the packaging on the other hand.

In the cited prior art documents a button is used, pushing the button may open the package. The child resistance provided by the box is independent of the content of the box. A child will try to push a button when it sees one.

In the invention, the child resistance is provided by the combination of the box and the solid food item. This concept is novel. The child would have to push through the perforations. This requires a certain force and purposefulness.

Preferably the packaging comprises two overlapping surfaces, an outer and an inner surface, wherein the outer and inner surface are provided with corresponding perforations and the inner surface is divided by the perforations in a first, inner, part and a second, outer, part.

Upon tearing the perforations, the first, inner, part and the second, outer, part are separated, whereupon the second, outer part can be unfolded to open the packaging.

Preferably the first, inner, part of the inner surface is glued to the outer surface and the other second, outer, part is not. This increases the efficiency.

In a preferred embodiment the perforation is close to the edge of the recess, hole, indentation or cut of the solid food item. A child placing the finger on the perforations and pushing will not lead to a push through of the perforation, since most of the finger pushes against the edge of solid food item. Only a proper placement of the finger and sufficient force will lead to a result. The distance between the perforation and the edge of the solid food item, closest to the perforation is for instance between 0.5 and 2.5 mm.

In preferred embodiments the solid food item is a chocolate bar or tablet or a candy. The firmness and solidity of chocolate and candy increases the safety, since even greater accuracy of placement of finger or thumb is required.

In preferred embodiments only a single solid food item is provided in the box shaped packaging. Each solid food item then has each own packaging.

In preferred embodiments the solid food item and the packaging comprise two or more corresponding perforations and recesses, cuts, indentations or holes respectively.

This increase the child resistance, since more complex action is required to open the packaging.

In embodiments the recess, cut, indentation or hole has a beveled edge. In other embodiments the edge is a straight edge.

In embodiments, there is an lateral off-set in position in the package between on the one hand the hole, cut, or indentation in the solid food item and on the other hand the perforation(s) in the packaging. Opening the package requires the user to shift the food item internally before pushing the perforations. This increases the child-safety of the package.

These and further aspects of the invention are described below and illustrated by means of the drawing:

The figures contained in the drawing show the following:

Not all figures are drawn to scale; as a rule, like numerals denote similar or like elements.

Figure 1:
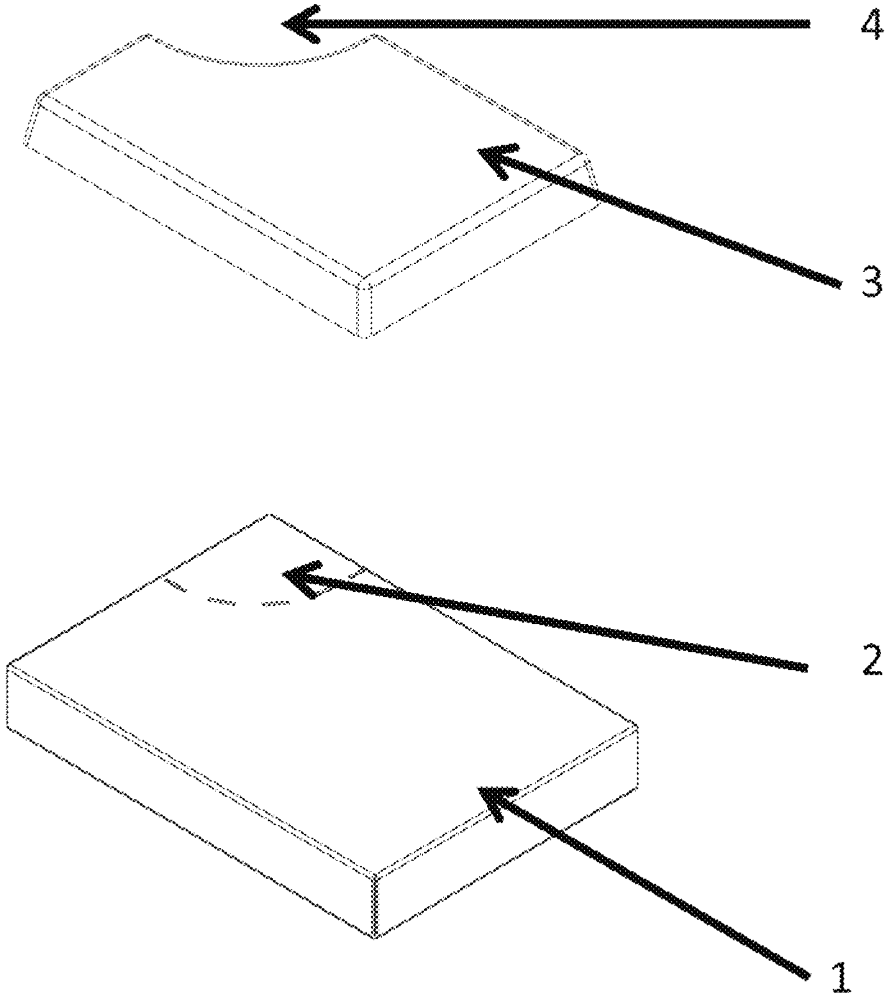
FIG. 1 illustrates an example of a combination of a solid food item and a packaging according to the invention.

FIG. 1 illustrates an embodiment. The box shaped packaging 1 comprises at a corner perforations 2. The solid food item 3, in this example for instance a chocolate tablet is provided with a cut corner 4, wherein the position and the shape of the cut corner 4 corresponds to the position and shape of the perforation 2, be it that the perforation 2 is slightly smaller.

Figure 2:
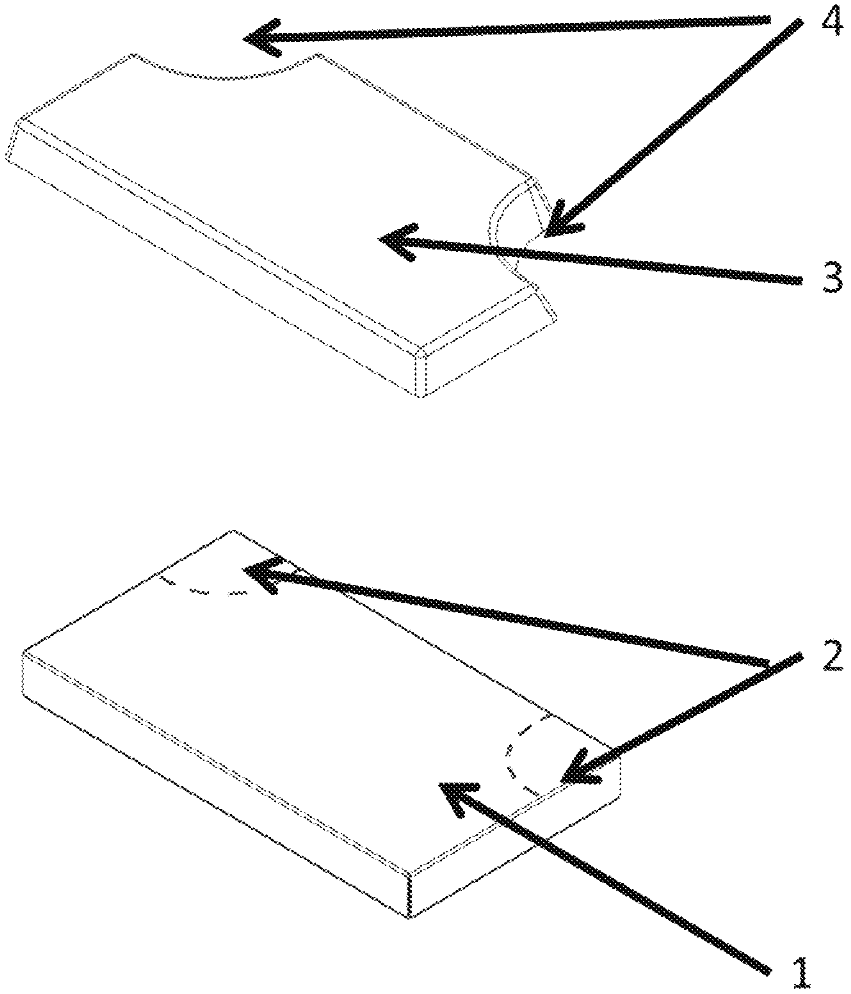
FIG. 2 illustrates a further example of combination of a solid food item and a packaging according to the invention.

FIG. 2 illustrates a further embodiment. The box shaped packaging 1 comprises at two corner perforations 2. The solid food item 3, in this example for instance a chocolate tablet is provided with two cut corners 4, wherein the position and the shape of the cut corners 4 corresponds to the position and shape of the perforations 2, be it that the perforations 2 are slightly smaller.

Figure 3:
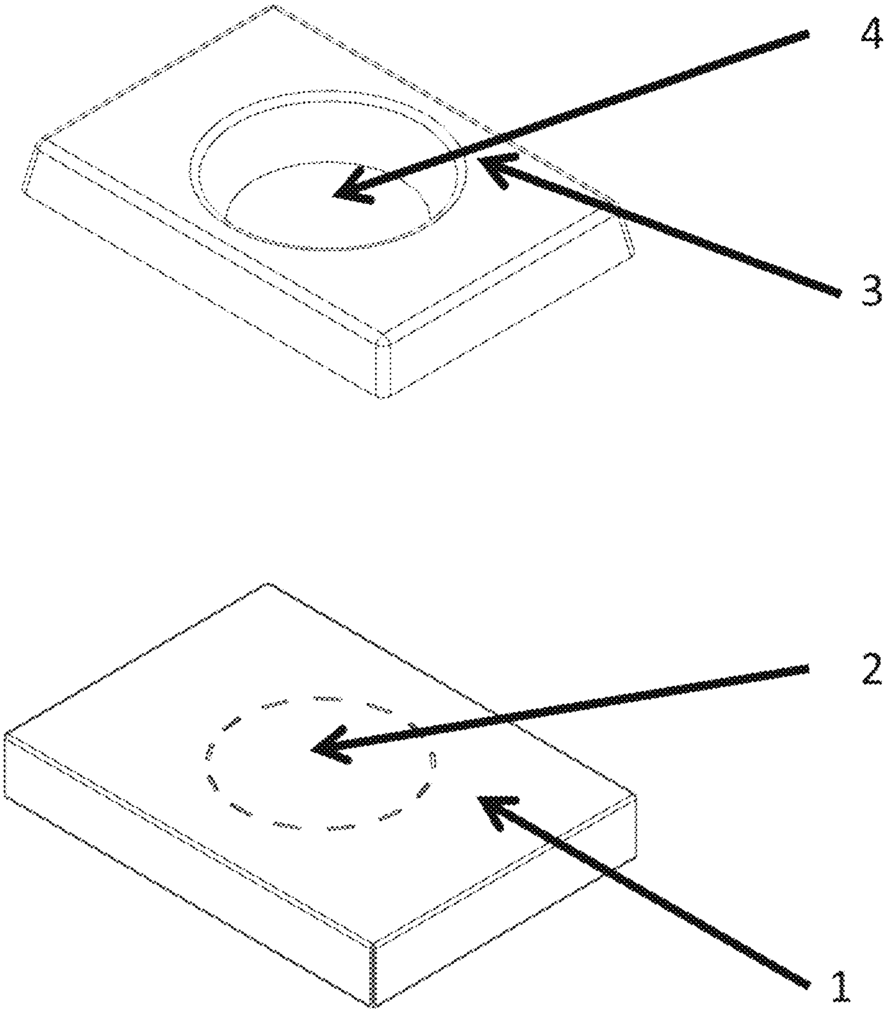
FIG. 3 illustrates a further example of combination of a solid food item and a packaging according to the invention.

FIG. 3 illustrates a further embodiment. The box shaped packaging 1 comprises a round central perforation 2. The solid food item 3, in this example for instance a chocolate tablet is provided with a central hole 4, wherein the position and the shape of the hole 4 corresponds to the position and shape of the central perforation 2, be it that the perforation 2 is slightly smaller.

Figure 4:
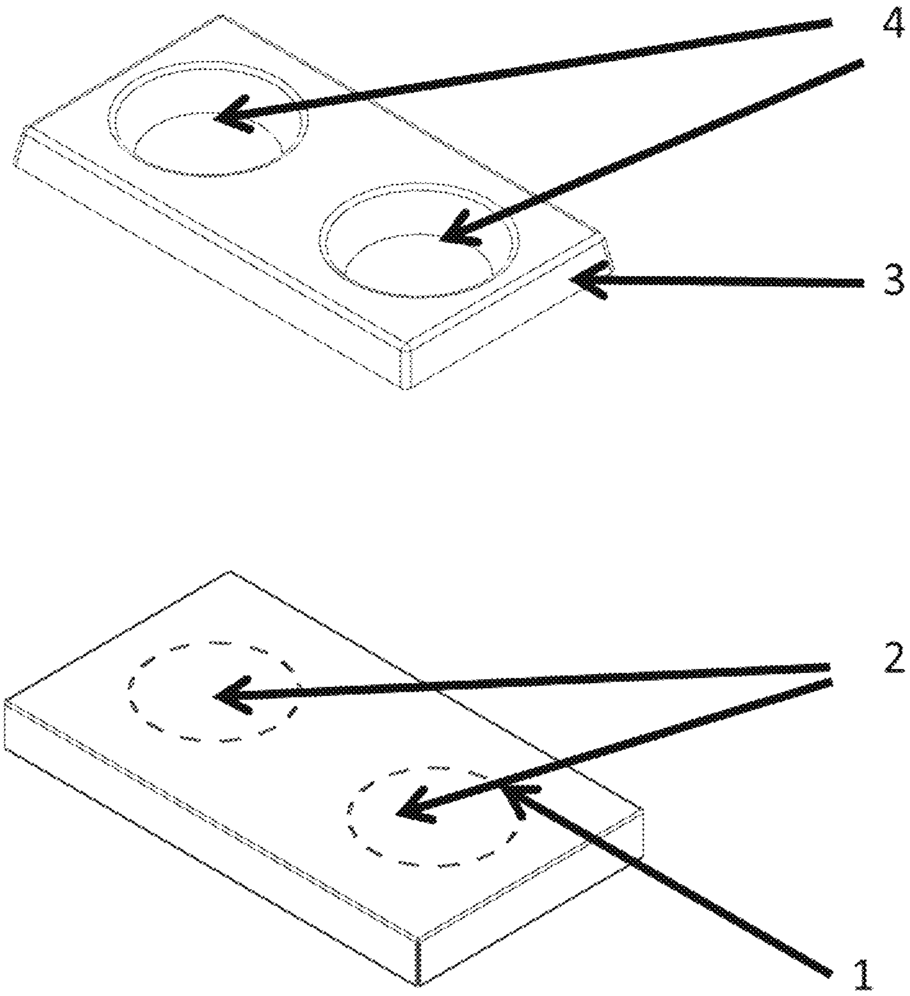
FIG. 4 illustrates a further example of combination of a solid food item and a packaging according to the invention.

FIG. 4 illustrates a further embodiment. The box shaped packaging 1 comprises two round perforations 2. The solid food item 3, in this example for instance a sugar candy is provided with two holes 4, wherein the position and the shape of the hole 4 corresponds to the position and shape of the round perforations 2, be it that the perforations 2 are slightly smaller.

Figure 5:
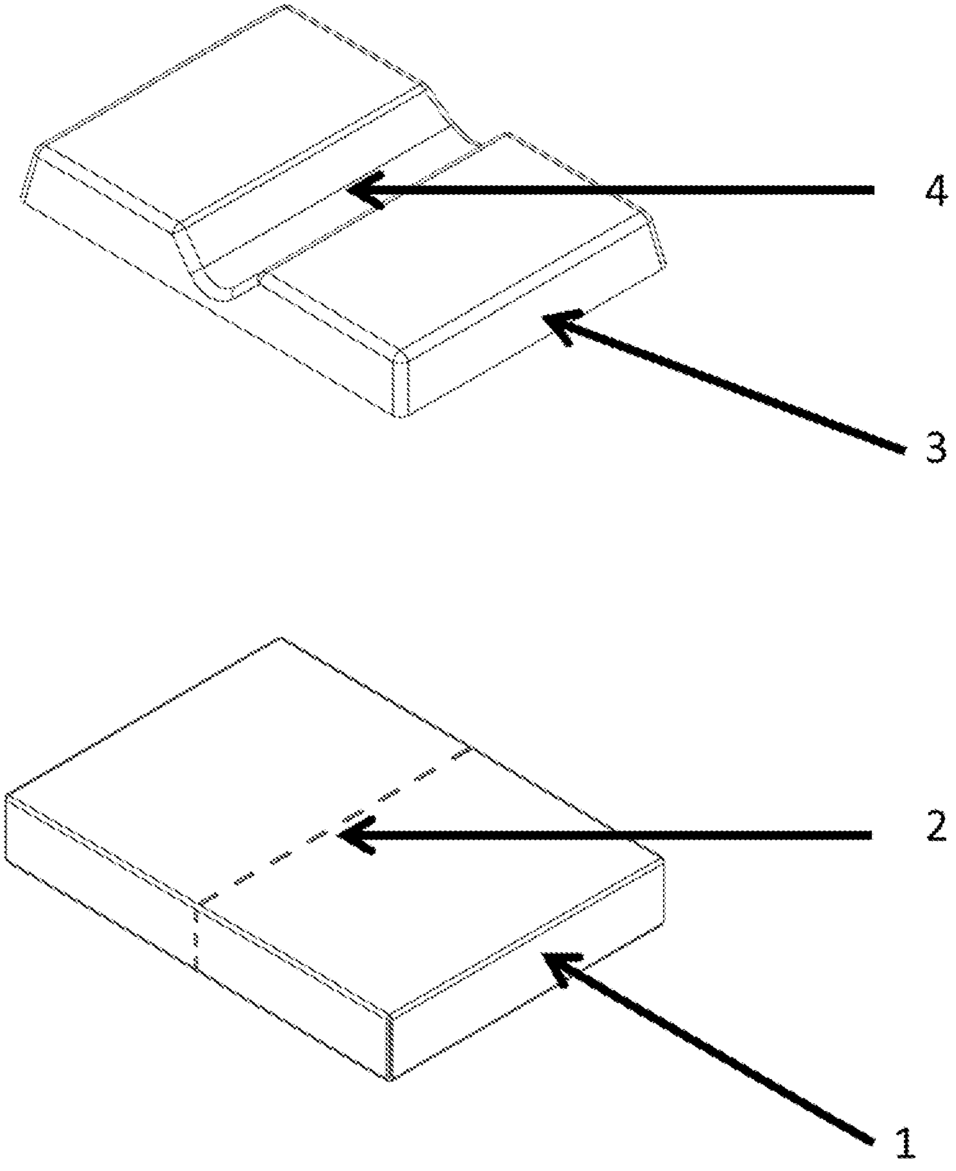
FIG. 5 illustrates a further example of combination of a solid food item and a packaging according to the invention.

FIG. 5 illustrates a further embodiment. The box shaped packaging 1 comprises a linear perforation 2 from one edge to an opposite edge. The solid food item 3, in this example for instance a chocolate tablet is provided with a linear indentation 4 from one edge to an opposite edge, wherein the position and the shape of the linear indentation 4 corresponds to the position and shape of the linear perforation 2, be it that the perforation 2 is slightly smaller.

Figure 6:
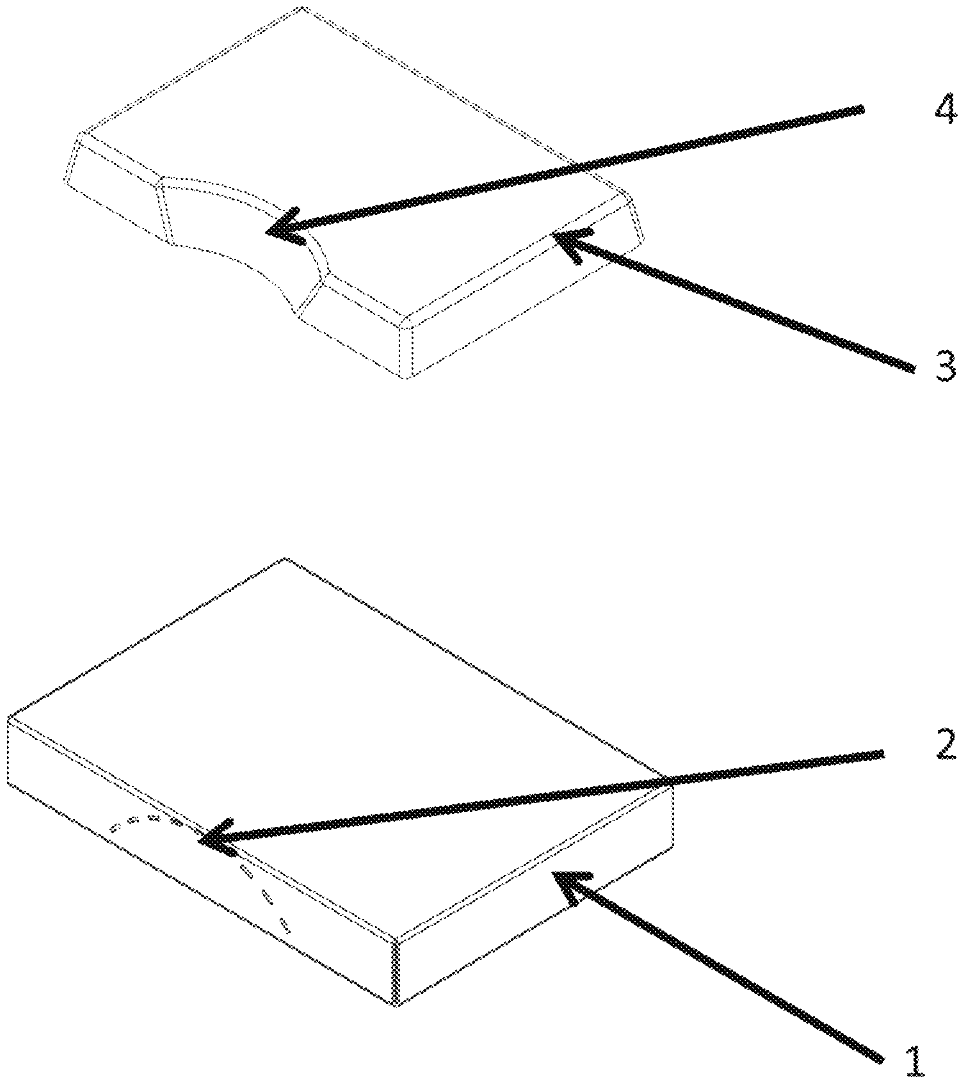
FIG. 6 illustrates a further example of combination of a solid food item and a packaging according to the invention.

FIG. 6 illustrates a further embodiment. The box shaped packaging 1 comprises at a middle of an edge a small perforation 2. The solid food item 3, in this example for instance a cookie is provided with a indentation at a central part of a corresponding edge 4, wherein the position and the shape of the indentation 4 corresponds to the position and shape of the edge perforation 2, be it that the perforation 2 is slightly smaller.

Figure 7:
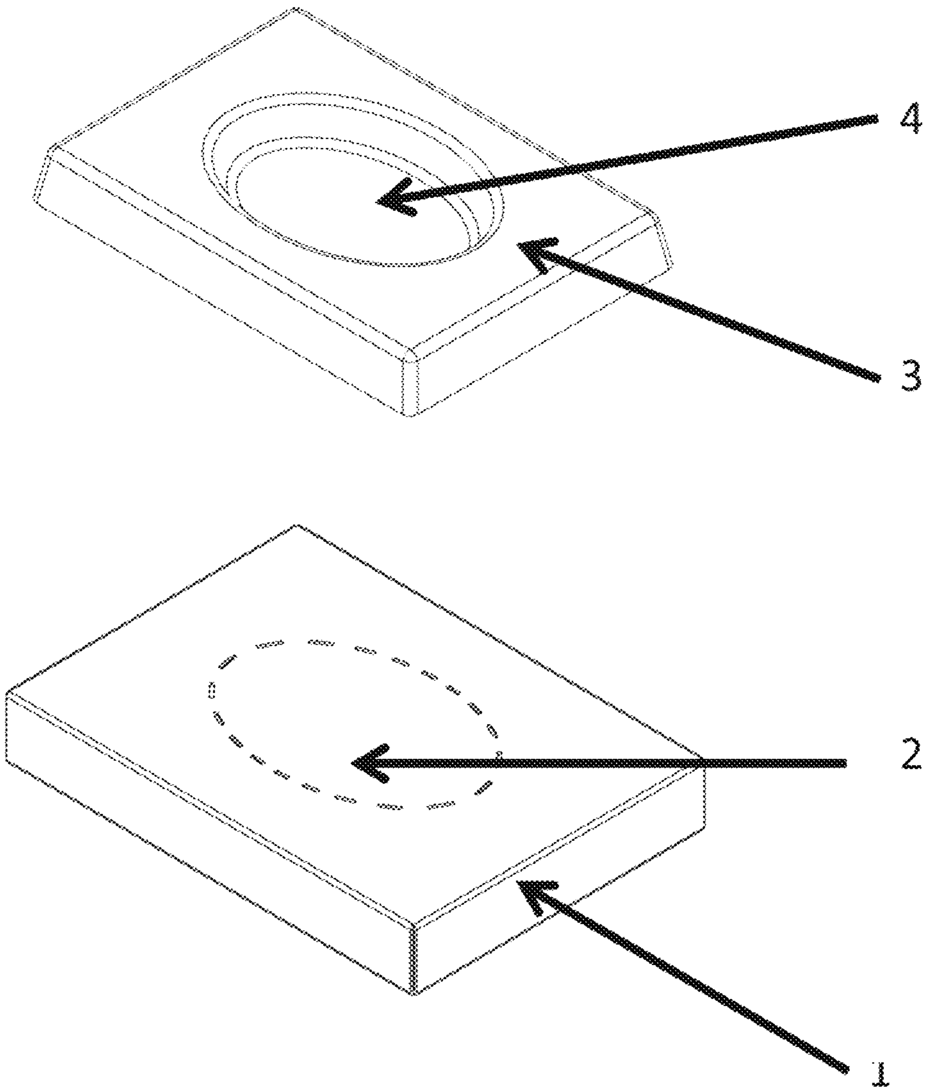
FIG. 7 illustrates a further example of combination of a solid food item and a packaging according to the invention.

FIG. 7 illustrates a further embodiment. The box shaped packaging 1 comprises a oval central perforation 2. The solid food item 3, in this example for instance a chocolate tablet is provided with a oval central indentation 4, wherein the position and the shape of the indentation 4 corresponds to the position and shape of the perforation 2, be it that the perforation 2 is slightly smaller.

Figure 8:
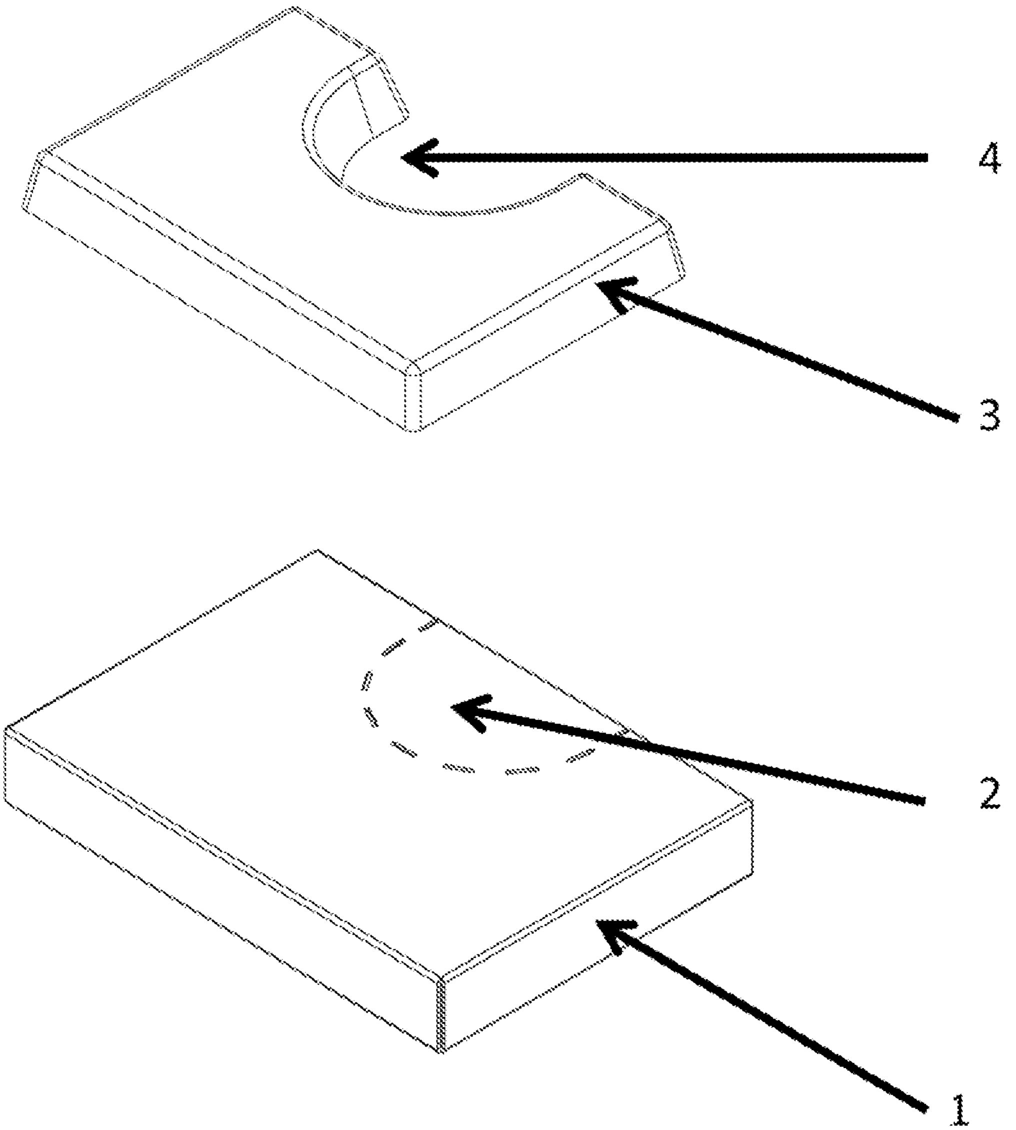
FIG. 8 illustrates a further example of combination of a solid food item and a packaging according to the invention.

FIG. 8 illustrates a further embodiment. The box shaped packaging 1 comprises at an edge a half-round perforation 2. The solid food item 3, in this example for instance a chocolate tablet is provided with a half-round hole 4, wherein the position and the shape of the half-round hole 4 corresponds to the position and shape of the half-round perforation 2, be it that the perforation 2 is slightly smaller.

The measures of the solid food item are for instance a tablet in the sizes 20 to 30 by 30 to 50 by 3-6 mm. The hole or cut may be for instance 15 to 25 mm and the weight of the product 5-15 gr.

These measures are provided as exemplary measures.

The solid food item of the invention may, as the various figures show, come in various forms and may come in various substances. This has the advantage that it is possible to use a particular form or substance or a combinations of these two aspects for a particular medicine or for a particular strength of a medicine, thereby strongly reducing the possibility of a mix-up for those patients that use several medicines The overall shape may be rectangular or square.

FIGS. 9 to 12 illustrate an embodiment of a package according to the invention.

Figure 9:
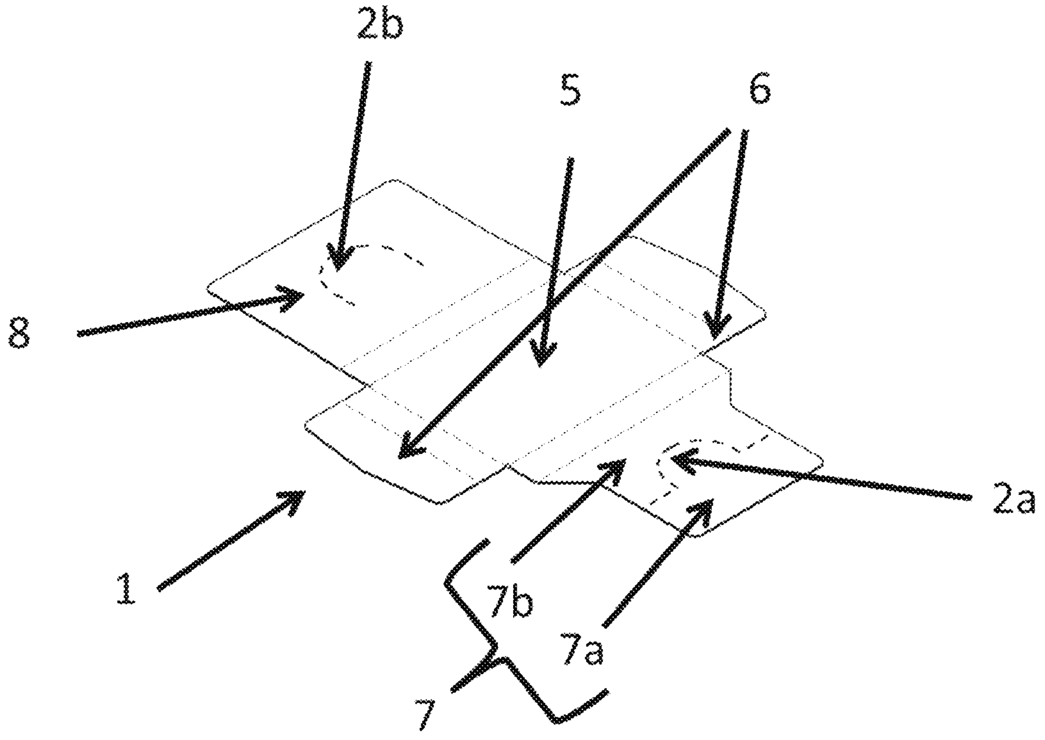
FIGS. 9 to 12 illustrate an embodiment of a package according to the invention.
Figure 10:
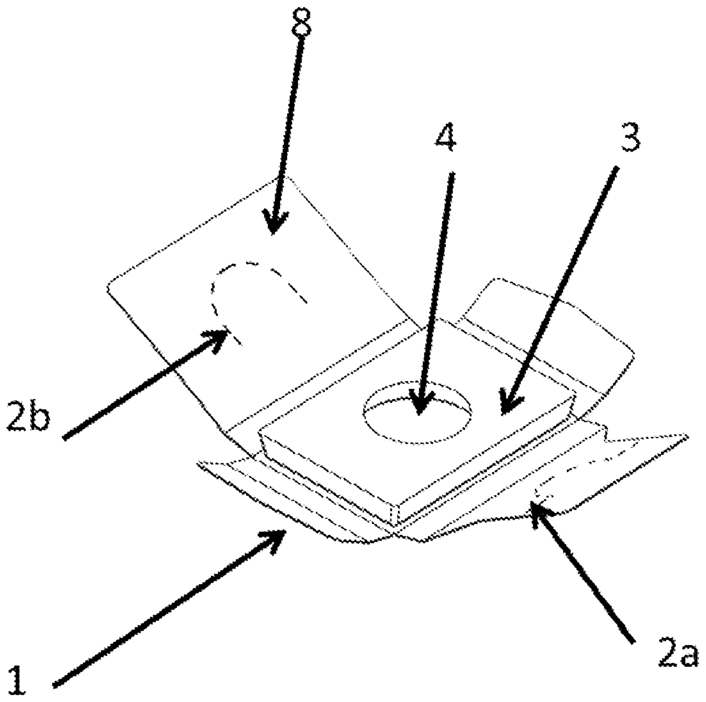
Figure 11:
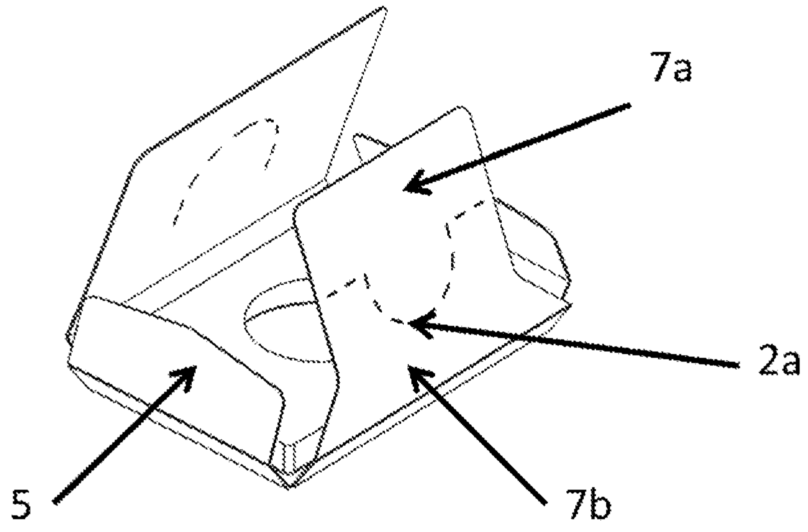
Figure 12:
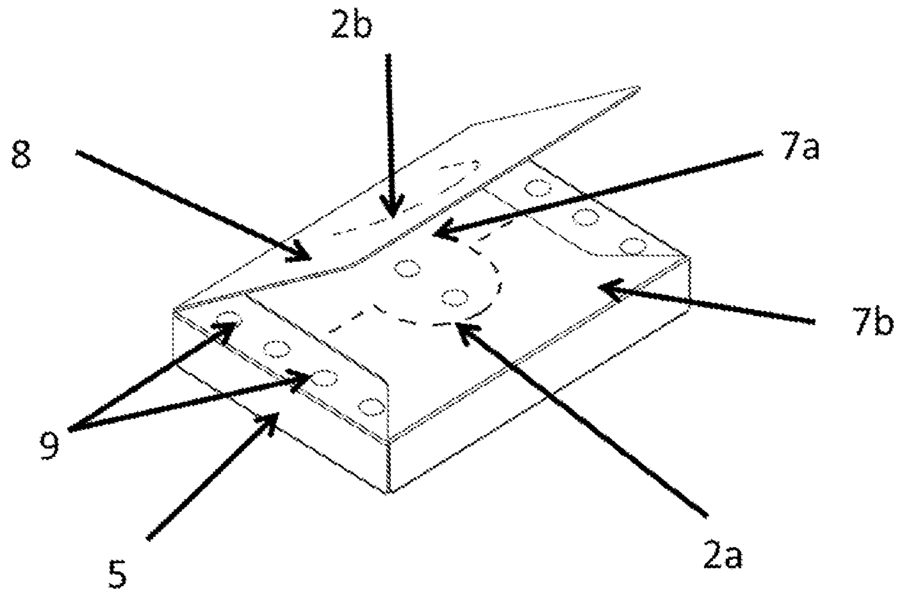

FIG. 9 shows a packaging 1 in unfolded state. The packaging 1 comprises a lower surface 5, two side flaps 6, a lower upper-surface 7 and an upper upper-surface 8. The lower upper-surface 7 comprises two parts a part **7*b* attached to lower surface 5 and a part 7*a*. In between these parts 7*a* and 7*b* a perforation 2*a* is provided. Upper upper-surface 8 is provided with perforation 2*b*. When folded to a box shape, the positions of perforations 2*a* and 2*b* correspond. FIGS. 10, 11 and 12 illustrates the folding method. A solid food item 3 with a recess, cut, indentation or hole, in this embodiment a hole 4, is placed on part 5, The flaps 5 and 6 and the parts 7 and 8 are folded over the solid food item 3, wherein part 7 is positioned inside and part 8 form an outer layer. Flaps 5 and 6 extend partly in between parts 7 and 8. In FIG. 12 it is shown that glue dots 9** may be used.

FIGS. 9 to 12 also show a preferred embodiment in which the packaging (1) comprises two overlapping surfaces, an outer (8) and an inner (7) surface, wherein the outer (8) and inner (7) surfaces are provided with corresponding perforations (**2*a*, 2*b*) and the inner surface (7) is divided by the perforation (2*a*) in a first, inner, part (7*a*) and a second, outer, part (7*b***).

Preferably the first, inner, part (**7*a*) of the inner surface (7) is glued to the outer surface (8) and the other second, outer, part (7*b*) is not as is shown by the glue dots on part 7*a***.

FIGS. 13 to 16 illustrate a method for extracting a solid food item from the package of FIGS. 9 to 12.

Figure 13:
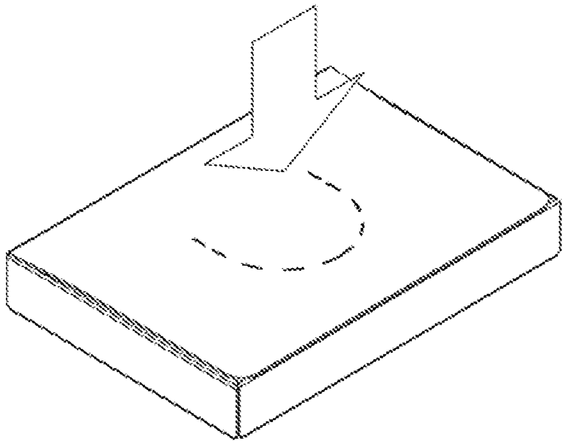
FIGS. 13 to 16 illustrate a method for extracting a solid food item from the package of FIGS. 9 to 12.
Figure 14:
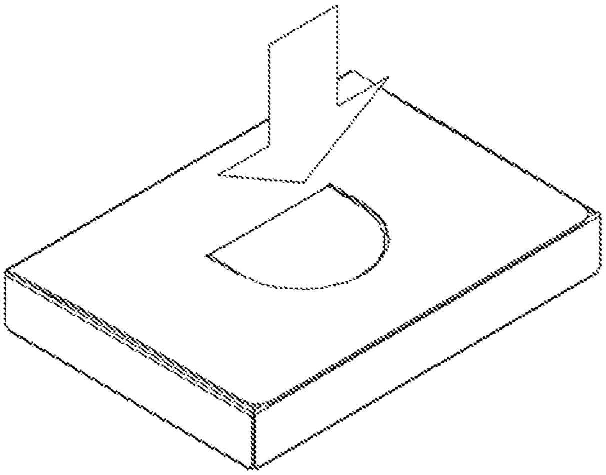
Figure 15:
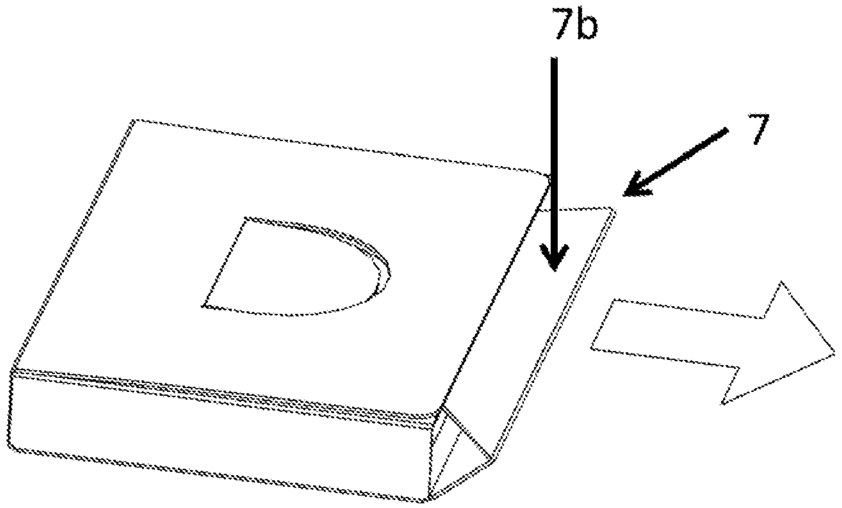
Figure 16:
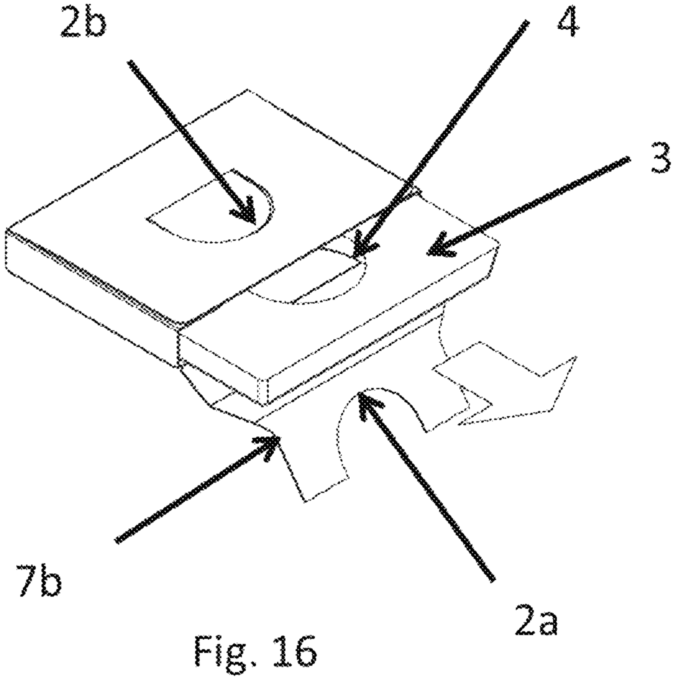

FIG. 13 illustrates schematically that a force, in FIG. 13 represented by a downward arrow, is exerted on perforation **2*b* in part 8. This force will break the perforations 2*b* and the perforation 2*a* in part 7, underlying upper layer 8. The breaking of the perforation 2*a* separates parts 7*a* and 7*b* from each other. Part 7*b* stays in the box-shaped packaging. The separation of parts 7*a* and 7*b* allows part 7*b* to be unfolded, as schematically illustrated in FIG. 15, opening up the side of box-shaped packaging 1, as schematically illustrated in FIG. 16, which allows taking out solid food item 3** from the packaging.

Figure 17:
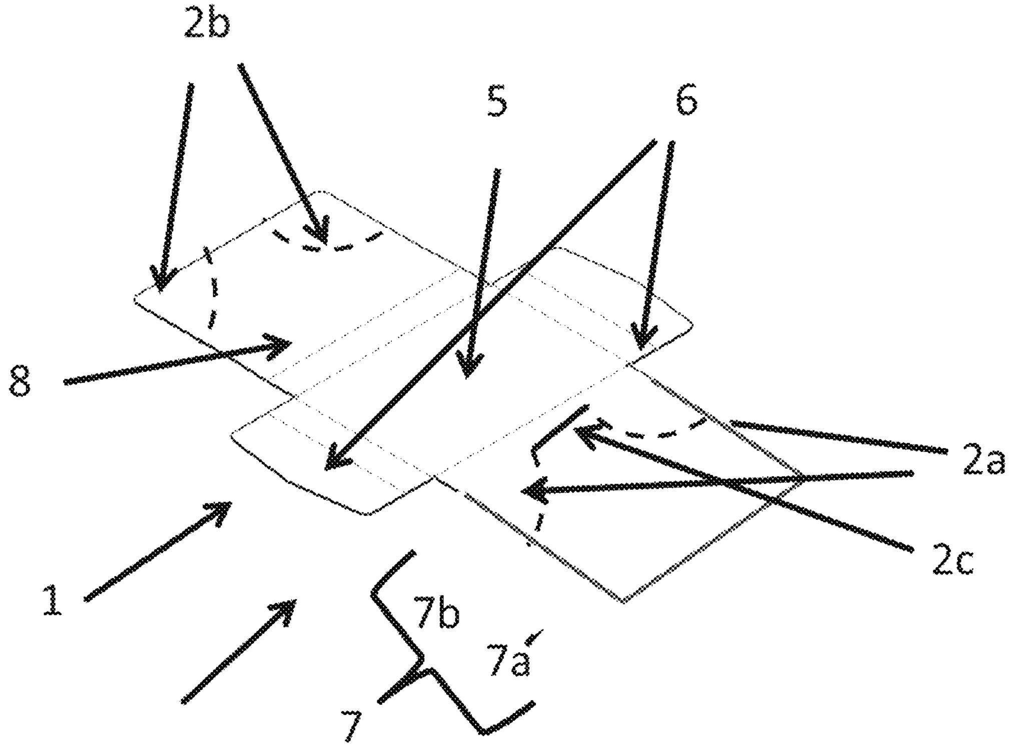
FIG. 17 illustrates an embodiment of a packaging according to the invention.

FIG. 17 illustrates an embodiment of a packaging according to the invention. This packaging is a packaging for the embodiment shown in FIG. 2.

In between the perforations **2*a* a slit 2*c* is provided. When the perforations 2B are pushed through, the perforations 2*a* are pushed through, the slit 2C enables the parts 7*a* and 7*b* to be disconnected. Although not shown in the figure, also in other embodiment slits may be provided, for instance between the two perforations in FIG. 4. Even when only a single perforation 2***a* is present in part 7, slits may be provided extending between the perforations and an edge or both edges of part 7.

Figure 18:
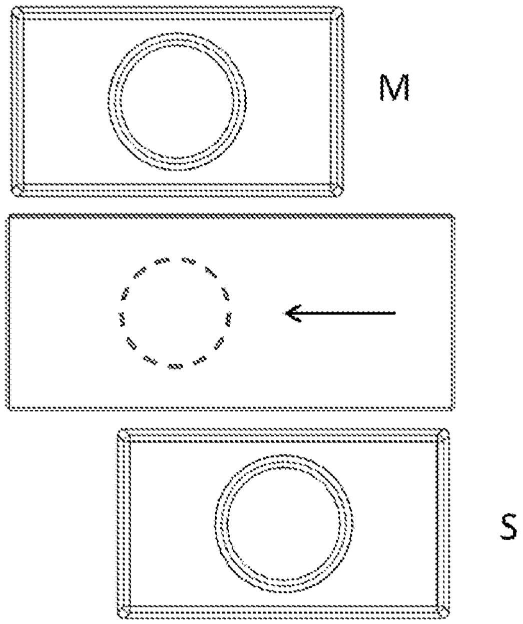
FIGS. 18 to 20 illustrate a preferred embodiment of the invention.
Figure 19:
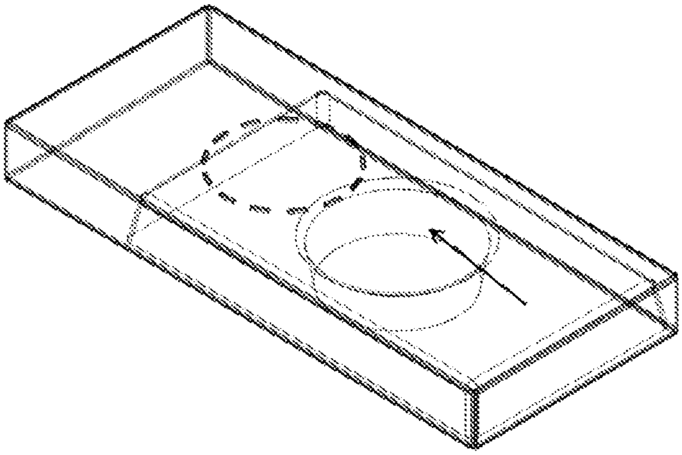
Figure 20:
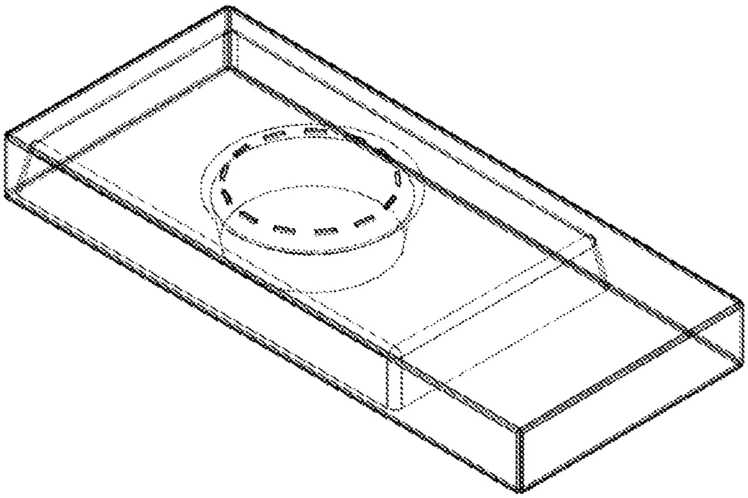

FIGS. 18 to 20 illustrate an embodiment of the invention. In this embodiment, there is an lateral off-set in position in the package between on the one hand the hole, cut, or indentation in the solid food item and on the other hand the perforation(s) in the packaging.

FIG. 18 illustrates that schematically the solid food item is initially, in the package as sold to the customer, in a starting position S. In said starting position there is a lateral off-set, meaning that the hole is not position under the perforation. Therefore, it is impossible to push the perforation through and open the package. The user has first to shift the solid food item inside the packaging (for instance by giving a quick jolt to the packaging or pushing at the solid food item from the outside. This shift the internal position of the solid food item vis-à-vis the perforation and the solid food item is moved to position M, in which position the hole and perforations correspond in position and the perforation may be pushed through to open the package. Such an additional required purposeful action is something an adult is well capable of doing, while this will, in most circumstances beyond the capabilities of a child, hereby rendering addition child-safety to the package.

It will be clear that the invention enables many variations and that the invention is not limited to the examples described above.

In the figures a single food item is provided in the package. This is the most preferred embodiment.

In principle, within the broader framework of the invention, more than one food item may be provided in the package wherein one of the solid food items acts as a key.

This, however, although providing a child-resistant packaging, may lead to a situation wherein an adult opens the child-resistant package, consumes the key solid food item and leaves the other solid food items in the opened packaging.

Therefore a package comprising a single solid food item is a preferred embodiment as providing the highest level of child-safety.

In embodiments the box shaped packaging may comprise two or more solid food items, wherein each solid food item s provided in a separate compartment and accessible from different sides, each solid food item having a corresponding perforation. This has the advantage of more solid food items in a package and reduces the above mentioned problem of reduced child-resistance once one food item is consumed, but at the cost of more complex packaging.

In summary, the invention can be described as follows:

A child resistant package comprising a child-resistant packaging containing there within a medicine wherein the packaging (1) has the shape of a box, wherein a solid food item (3), the solid food item (3) comprising the medicine, wherein the overall shape of the solid food item (3) and the box correspond, and the packaging is provided with a perforation (2) and the solid food item is provided with a recess, cut, indentation or hole (4) wherein the positions and shape of the recess, cut indentation or hole (4) in the food item and the perforations (2) in the packaging correspond, the perforation (2) falling within the recess, hole, indentation or cut (4) wherein punching the perforation (2) is required for opening the box.

I claim:

1. A child resistant package comprising
an outer packaging,
wherein the outer packaging is configurable to form a box shaped packaging,
wherein an interior of the box shaped packaging is configured to accept a solid food item comprising a medicine,
wherein the outer packaging is provided with at least one perforation,
wherein the solid food item comprises a void,
wherein the void comprises at least one of a recess, a cut, an indentation, and a hole in the solid food item,
wherein a position and shape of the void and the perforation in the outer packaging correspond when the outer packaging is configured as the box shaped packaging, such that, when opening the package, a portion of the outer packaging defined by the perforation is situated within the void,
wherein opening the outer packaging comprises piercing the perforation,
wherein the outer packaging comprises two overlapping surfaces, an outer surface and an inner surface, and
wherein the outer and inner surfaces are provided with corresponding perforations and the inner surface is divided by the perforation in a first, inner, part and a second, outer, part.

2. The child resistant package of claim 1, wherein the first, inner, part of the inner surface is glued to the outer surface and the other second, outer, part is not.

3. The child resistant package of claim 1, wherein the perforation is close to an edge of the void.

4. The child resistant package of claim 3, wherein a distance between the perforation and the edge of the void closest to the perforation is between 0.5 and 2.5 mm.

5. The child resistant package of claim 1, wherein the solid food item comprises a chocolate bar or tablet or a candy.

6. The child resistant package of claim 1, wherein only a single solid food item is provided in the box shaped packaging.

7. The child resistant package of claim 1, wherein the box shaped packaging comprises two or more solid food items, each in a separate compartment and accessible from different sides.

8. The child resistant package of claim 1, wherein the solid food item and the packaging comprise two or more corresponding perforations and voids respectively.

9. The child resistant package of claim 1, wherein the void has a beveled edge.

10. The child resistant package of claim 1,
wherein there is a lateral off-set in position in the box shaped packaging between the void in the solid food item and the perforation, and
wherein the box shaped packaging enables a lateral shift of the solid food item to align the void and the perforation.

11. A child resistant package comprising
an outer packaging,
wherein the outer packaging is configurable to form a box shaped packaging,
wherein an interior of the box shaped packaging is configured to accept a solid food item comprising a medicine,
wherein the outer packaging is provided with at least one perforation, wherein the solid food item comprises a void, wherein the void comprises at least one of a recess, a cut, an indentation, and a hole in the solid food item, wherein a position and shape of the void and the perforation in the outer packaging correspond when the outer packaging is configured as the box shaped packaging, such that, when opening the package, a portion of the outer packaging defined by the perforation is situated within the void, wherein opening the outer packaging comprises piercing the perforation, wherein the packaging comprises a surface comprising a first layer and a second layer;

wherein the first layer and the second layer are partially bonded together;

wherein the first layer and the second layer have perforations corresponding to the void; and wherein the piercing of the perforations enables at least a part of the first layer to be separated from the second layer.

12. The medical product of claim 11, wherein the edible item comprises a chocolate flavor.

13. The medical product of claim 11, wherein the edible item comprises a candy flavor.

14. The medical product of claim 11, wherein the edible item and the package comprise at least two corresponding voids and perforations.

15. The medical product of claim 11, wherein the void comprises at least one beveled edge.

16. The medical product of claim 11, wherein a distance between the perforation and an edge of the void closest to the perforation is between 0.5 and 2.5 mm.

17. The medical product of claim 11, wherein:

the product comprises two or more edible items;

the package comprises a separate compartment for each edible item;

the package comprises perforations corresponding to the voids of each edible item in each compartment.

18. A child resistant package comprising an outer packaging, wherein the outer packaging is configurable to form a box shaped packaging, wherein an interior of the box shaped packaging is configured to accept a solid food item comprising a medicine, wherein the outer packaging is provided with at least one perforation, wherein the solid food item comprises a void, wherein the void comprises at least one of a recess, a cut, an indentation, and a hole in the solid food item, wherein a position and shape of the void and the perforation in the outer packaging correspond when the outer packaging is configured as the box shaped packaging, such that, when opening the package, a portion of the outer packaging defined by the perforation is situated within the void, wherein opening the outer packaging comprises piercing the perforation, as packaged, there is a lateral off-shift between the void and the perforation; and the package is configured to enable a lateral shift of the edible item to align the void and the perforation.

19. The medical product of claim 18, wherein the edible item comprises a chocolate flavor.

20. The medical product of claim 18, wherein the edible item comprises a candy flavor.

* * * * *